US012710391B2

(12) United States Patent
Asai et al.

(10) Patent No.: US 12,710,391 B2
(45) Date of Patent: Aug. 18, 2026

(54) ELECTROCHEMICAL SENSOR

(71) Applicant: FIRST SCREENING CORPORATION, Tokyo (JP)

(72) Inventors: Kai Asai, Tokyo (JP); Yohei Kanazawa, Tokyo (JP); Jun Mashiko, Tokyo (JP)

(73) Assignee: FIRST SCREENING CORPORATION, Tokyo (JP)

( * ) Notice: Subject to any disclaimer, the term of this patent is extended or adjusted under 35 U.S.C. 154(b) by 126 days.

(21) Appl. No.: 18/559,916

(22) PCT Filed: Jan. 18, 2022

(86) PCT No.: PCT/JP2022/001507
§ 371 (c)(1),
(2) Date: Nov. 9, 2023

(87) PCT Pub. No.: WO2022/239301
PCT Pub. Date: Nov. 17, 2022

(65) Prior Publication Data

US 2024/0230577 A1 Jul. 11, 2024

(30) Foreign Application Priority Data

May 12, 2021 (JP) ................................ 2021-080727

(51) Int. Cl.
*G01N 27/327* (2006.01)

(52) U.S. Cl.
CPC ................................ *G01N 27/3272* (2013.01)

(58) Field of Classification Search
CPC .. G01N 27/3272; G01N 27/28; G01N 27/327; G01N 27/416
See application file for complete search history.

(56) References Cited

U.S. PATENT DOCUMENTS

2007/0068807 A1 3/2007 Feldman et al.
2010/0078322 A1 4/2010 Yamanishi et al.
(Continued)

FOREIGN PATENT DOCUMENTS

CN 103424564 A 12/2013
JP 2006-047125 A 2/2006
JP 2007-003361 A 1/2007
(Continued)

OTHER PUBLICATIONS

International Search Report issued in Patent Application No. PCT/JP2022/001507 dated Mar. 22, 2022.
(Continued)

*Primary Examiner* — Gurpreet Kaur
(74) *Attorney, Agent, or Firm* — Rankin, Hill & Clark LLP

(57) ABSTRACT

There is provided an electrochemical sensor 10, including: a plate-like member 11 having a first surface and a second surface that are in a front-back relationship and a sample liquid supply channel 11*a* arranged on a first surface side; a liquid reservoir 15, which is arranged on a second surface side of the plate-like member 11 and into which part of the sample liquid flows, the sample liquid having passed through a downstream end 11*c* of the plate-like member 11 that includes the supply channel; and a liquid sampling port 15*a* serving as an inlet of the liquid reservoir 15, which is spaced upstream of the supply channel 11 from the downstream end 11*c* of the plate-like member 11 in a plan view.

6 Claims, 6 Drawing Sheets

(56) References Cited

U.S. PATENT DOCUMENTS

| | | | |
|---|---|---|---|
| 2013/0306472 | A1 | 11/2013 | Kaneda et al. |
| 2014/0138244 | A1 | 5/2014 | Teucher et al. |

FOREIGN PATENT DOCUMENTS

| | | | |
|---|---|---|---|
| JP | 2009-510405 | A | 3/2009 |
| JP | 2011-007717 | A | 1/2011 |
| JP | 2014-521057 | A | 8/2014 |
| JP | 2016-004027 | A | 1/2016 |

OTHER PUBLICATIONS

English Translation of Written Opinion issued in PCT/JP2022/001507 dated Mar. 22, 2022.

(a)

(b)

(a)

(b)

ELECTROCHEMICAL SENSOR

TECHNICAL FIELD

The present invention relates to an electrochemical sensor that electrochemically detects a specific component in a sample liquid.

DESCRIPTION OF RELATED ART

In recent years, for a diagnosis and prevention of a disease of a subject, it has been practiced to detect a specific component in a sample liquid such as urine, using an electrochemical sensor and measure a concentration value. Particularly, urine can be sampled without injuring a body, so that it is less burdensome for a subject and is convenient as a sample liquid for measurement. In this case, it is desirable that the sampling of urine be extremely simple, that is, the subject only needs to urinate directly into an electrochemical sensor. Therefore, as an electrochemical sensor supplied with a sample liquid such as urine having a flow, there is the one configured as follows: when exposed to the flow of the sample liquid, a liquid reservoir is filled with the sample liquid by capillary action, whereby a certain amount of the sample liquid can be sampled, so that a sensor electrode is brought into contact with the sample liquid in the liquid reservoir (for example, see Patent Document 1).

PRIOR ART DOCUMENT

Patent Document

[Patent Document 1] JP-A-2011-007717

SUMMARY OF THE INVENTION

Problem to be Solved by the Invention

However, in the electrochemical sensor with a conventional configuration described above, even after the sample liquid is stored in the liquid reservoir due to capillary action, if the sample liquid that is in contact with the sensor continues to flow, a suction force is generated due to the affinity between the sample liquids, and the sample liquid in the liquid reservoir is possibly sucked out due to the flow of the sample liquid. When the sample liquid in the liquid reservoir is sucked out, there is a concern such that the contact amount of the sample liquid to the sensor electrode cannot be guaranteed, resulting in an adverse effect on a sensing result using the sensor electrode.

The present disclosure provides a technique of reducing a suction force generated by the flow of the sample liquid even when the sample liquid in contact with the sensor continues to flow after the sample liquid is stored by capillary action, thus preventing the stored sample liquid from being sucked out.

Means for Solving the Problem

According to one aspect of the present disclosure, there is provided an electrochemical sensor, including:

- a plate-like member having a first surface and a second surface that are in a front-back relationship and a sample liquid supply channel arranged on a first surface side;
- a liquid reservoir, which is arranged on a second surface side of the plate-like member and into which part of the sample liquid flows, the sample liquid having passed through a downstream end of the plate-like member that includes the supply channel; and
- a liquid sampling port serving as an inlet of the liquid reservoir, which is spaced upstream of the supply channel from the downstream end of the plate-like member in a plan view.

Advantage of the Invention

According to the present disclosure, even when the sample liquid in contact with the sensor continues to flow after the sample liquid is stored by capillary action, the suction force generated by the flow of the sample liquid can be weakened, and the stored sample liquid can be prevented from being sucked out.

DETAILED DESCRIPTION OF THE INVENTION

An embodiment of the present disclosure will be described below with reference to the drawings.

First Embodiment

First, a first embodiment of the present disclosure will be described.

(Overview of an Electrochemical Sensor)

The electrochemical sensor according to this embodiment electrochemically detects a specific component in a sample liquid. For example, this embodiment shows a case of detecting uric acid contained in urine sampled from a subject. That is, this embodiment shows a case in which the urine is sampled from the subject as a sample liquid, and shows a case in which uric acid contained in the urine is detected as a specific component to be detected.

The uric acid concentration in urine is detected, for example, by electrolyzing a substance contained in the urine under specific conditions and utilizing an electrochemical reaction (e.g., oxidation-reduction reaction) that occurs at that time. For example, this embodiment shows a case in which the uric acid concentration in urine is detected by a three-electrode method. The three-electrode method is a method of performing electrochemical measurement by combining three electrodes such as a working electrode, a counter (counter) electrode, and a reference electrode.

Figure 1:
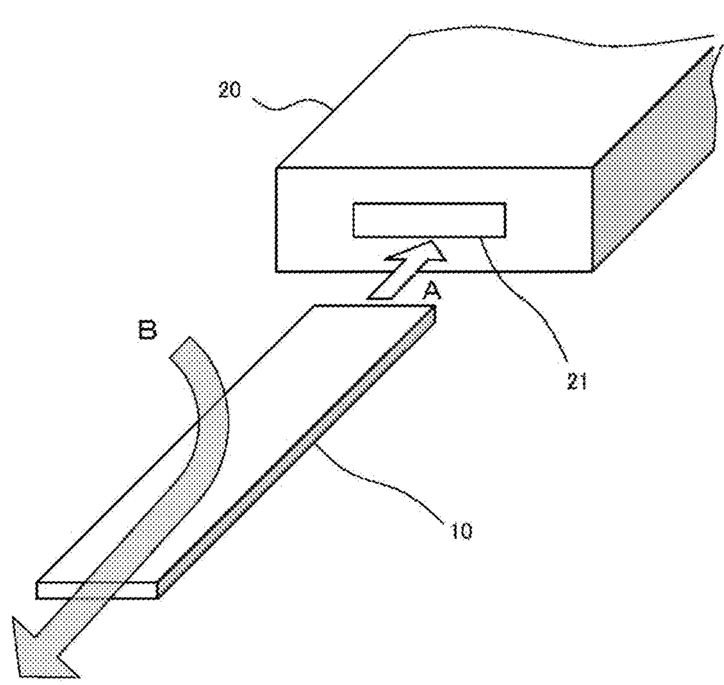
FIG. 1 is a perspective view schematically showing a specific example of usage of an electrochemical sensor according to a first embodiment of the present disclosure.

FIG. 1 is a perspective view schematically showing a specific example of usage of an electrochemical sensor 10 according to this embodiment.

As shown in the figure, the electrochemical sensor 10 according to this embodiment is formed in a strip shape, and is used, with one end side thereof inserted into an insertion port (slot) 21 of a measuring device 20 (see arrow A in the figure).

The measuring device 20 is, for example, a device called a potentiostat, and is configured such that a predetermined voltage sweeping operation can be performed while being electrically connected to each electrode of the electrochemical sensor 10 inserted into an insertion port 21. For this purpose, the measuring device 20 has, for example, a voltage application unit, a current measurement unit, a potential difference measurement unit, and a potential adjustment unit. The voltage application unit is configured to apply a voltage between the working electrode and the counter electrode in the electrochemical sensor 10 when a predetermined circuit is formed by connection with the electrochemical sensor 10. The current measurement unit is configured to measure a current generated by the oxidation-reduction reaction of uric acid. The potential difference measurement unit is configured to measure a potential difference between the working electrode and the reference electrode. The potential adjustment unit is configured to keep the potential of the working electrode constant based on the potential difference measured by the potential difference measurement unit, with the potential of the reference electrode as a reference.

Urine flowed by subject's urination is directly supplied to the electrochemical sensor 10 (see arrow B in the figure) in the state of being inserted into the insertion port 21 of the measuring device 20 as described above. Thereby, at least an area in the vicinity of the end of the electrochemical sensor 10 on the side opposite to the insertion end into the insertion port 21, comes into contact with the flow of urine, which is the sample liquid.

When exposed to the flow of the urine, the electrochemical sensor 10 uses capillary action to sample part of the flowing urine. Then, the electrochemical sensor makes each electrode (ie, three electrodes: the working electrode, the counter electrode, and the reference electrode) contact with the sampled urine. In this manner, the uric acid concentration in the sampled urine can be detected by the three-electrode method.

(Configuration Example of the Electrochemical Sensor)

Here, a configuration example of the electrochemical sensor 10 according to this embodiment will be specifically described.

Figure 2:
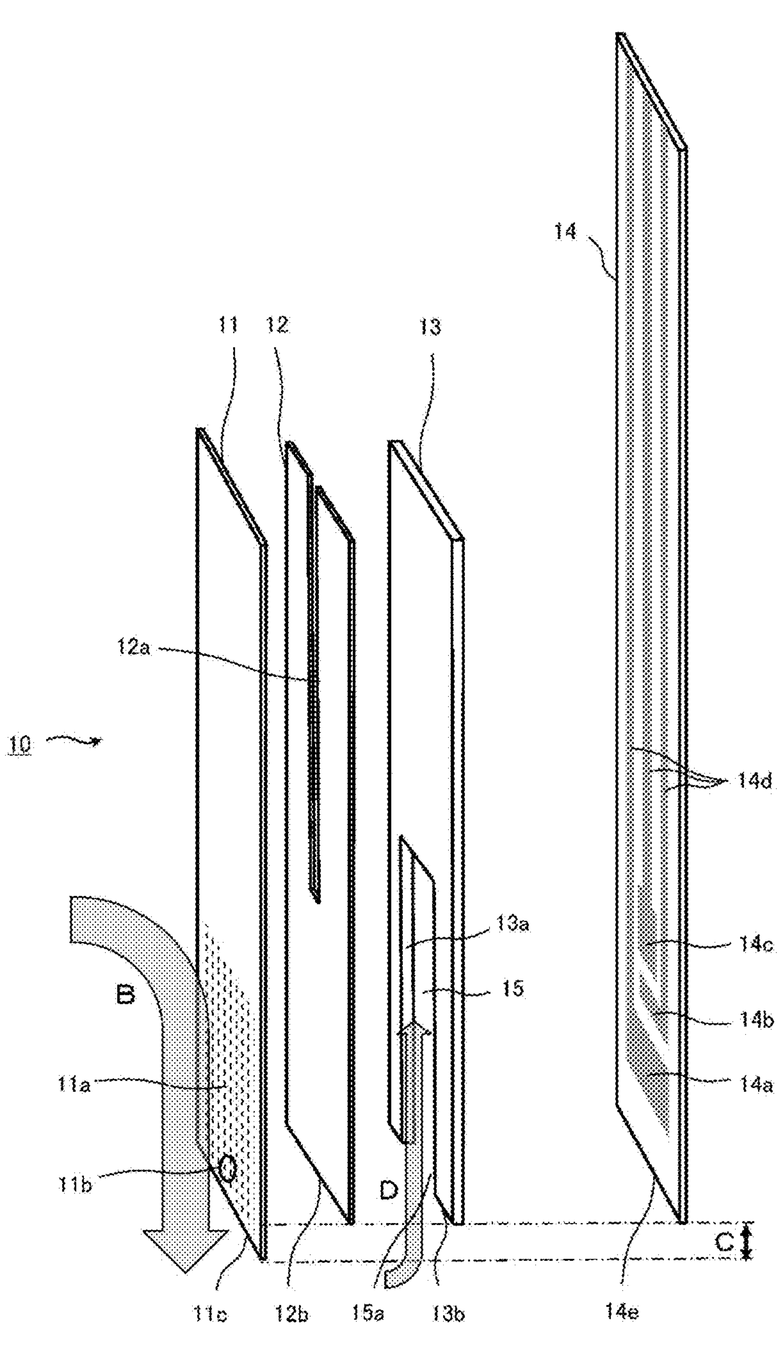
FIG. 2 is an exploded perspective view schematically showing a configuration example of the electrochemical sensor according to the first embodiment of the present disclosure.

FIG. 2 is an exploded perspective view schematically showing the configuration example of the electrochemical sensor 10 according to this embodiment. This configuration example shows each component in a separated state for the sake of convenience.

The electrochemical sensor 10 according to this embodiment includes a protective cover member 11, a channel cover member 12, a spacer member 13, and a substrate 14, which are laminated.

The protective cover member 11 is provided for covering and protecting each electrode 14*a*, 14*b*, 14*c* on the substrate 14, which will be described later, and is formed by a plate-like member having a first surface (for example, front surface) and a second surface (for example, rear surface) that are in a front-back relationship. The protective cover 11 is configured as follows: when urine, which is a sample liquid, is supplied to the electrochemical sensor 10 (see arrow B in the figure), the supplied urine flows along the first surface, thereby forming a urine supply channel 11*a* on the first surface side.

The protective cover member 11 is formed of a material with water resistance, specifically, any one of resin materials, ceramics, glass, paper, etc., preferably a resin material such as polyethylene (PE) and polyethylene terephthalate (PET). When the protective cover member 11 is formed of a resin material such as PE or PET, the plate thickness of the protective cover member 11 may be about 0.1 to 0.6 mm.

The protective cover member 11 includes a through hole 11*b* passing therethrough in a plate thickness direction, in the vicinity of the end 11*c* opposite to the insertion end when the electrochemical sensor 10 is inserted into the insertion port 21 of the measuring device 20 (that is, the downstream end of the supply channel 11*a*). The planar shape of the through hole 11*b* is not particularly limited.

The channel cover member 12 is arranged so as to be in contact with the second surface of the protective cover member 11, and constitutes part of a wall surface of the liquid reservoir 15, which will be described later. Further, the channel cover member 12 also includes a slit groove 12*a* for constituting an airway connected to the liquid reservoir 15. The airway constituted by the slit groove 12*a* is open to the atmosphere at the end opposite to the liquid reservoir 15.

The channel cover member 12 is formed of the same material as the protective cover member 11.

The channel cover member 12 is laminated on the protective cover member 11, in a state of being spaced upstream of the supply channel 11*a* at a predetermined distance (see arrow C in the figure) away from the position of the downstream end 11*c* of the protective cover member 11 in a plan view. Details of the predetermined distance will be described later.

The spacer member 13 is arranged so as to be interposed between the channel cover member 12 and the substrate 14, and is provided for constituting a liquid reservoir 15, which will be described later. For this reason, the spacer member 13 includes a notch 13*a* for constituting the liquid reservoir 15.

The spacer member 13 is formed of the same material as the protective cover member 11 and the channel cover member 12.

Similarly to the channel cover member 12, the spacer member 13 is also laminated on the channel cover member 12, in a state where the downstream end 13*b* of the supply channel 11*a* is spaced upstream of the supply channel 11*a* at a predetermined distance (see arrow C in the figure) away from the position of the downstream end 11*c* of the protective cover member 11 in a plan view.

The substrate 14 supports the working electrode 14*a*, the counter electrode 14*b* and the reference electrode 14*c* for detection by the three-electrode method, and is configured as follows: the electrodes 14*a*, 14*b*, and 14*c* are respectively mounted on the area in the vicinity of the downstream end 14*e* of the supply channel 11*a*, and the side opposite to the end 14*e* is the insertion end into the insertion port 21 of the measuring device 20. Further, wiring 14*d* is provided to the substrate 14 to electrically connect each of the electrodes 14*a*, 14*b*, 14*c* to the measuring device 20 individually. Examples of the working electrode 14*a* include: a tip-shaped electrode (diamond tip electrode) having a diamond film that causes an oxidation-reduction reaction in response to an applied voltage in a state where urine is adhered. Examples of the counter electrode 14*b* include: electrodes formed of metals such as platinum (Pt), gold (Au), copper (Cu), palladium (Pd), nickel (Ni), silver (Ag), diamond electrodes, boron doped diamond (BDD) electrodes, carbon electrodes, etc. Examples of the reference electrode 14*c* include: silver/silver chloride (Ag/AgCl) electrodes, standard hydrogen electrodes, reversible hydrogen electrodes, palladium/hydrogen electrodes, saturated calomel electrodes, carbon electrodes, diamond electrodes, electrodes formed of metals such as Pt, Au, Cu, Pd, Ni, Ag, etc. Each of these electrodes 14*a*, 14*b*, 14*c* and wiring 14*d* may be configured using a known technique, and detailed description thereof will be omitted here.

The substrate 14 is formed of the same material as the protective cover member 11, the channel cover member 12 and the spacer member 13.

Similarly to the channel cover member 12 and spacer member 13, the substrate 14 is also laminated on the spacer member 13, in the state where the downstream end 14*e* of the flow in the supply channel 11*a* is spaced upstream of the supply channel 11*a* at a predetermined distance (see arrow C in the figure) away from the position of the downstream end 11*c* of the protective cover member 11 in a plan view.

When the protective cover member 11, the channel cover member 12, the spacer member 13, and the substrate 14 are laminated as described above, the notch 13*a* of the spacer member 13 is sandwiched between the channel cover member 12 and the substrate 14, thereby forming a space with four sides surrounded by these ends, on the second surface side of the protective cover member 11. This space constitutes the liquid reservoir 15.

The liquid reservoir 15 is configured to store a certain amount of urine in the space that serves as the liquid reservoir 15. Part of the urine supplied to the supply channel 11*a* of the protective cover member 11 (see arrow B in the figure) passes through the downstream end 11*c* of the protective cover member 11 and flows into the liquid reservoir 15 (see arrow D in the figure). Specifically, regarding the urine with fluctuating flow velocity, flow shape, etc., several μL or more of urine passes through the downstream end 11*c* by pouring urine for several seconds. By flowing of such urine, the space that forms the liquid reservoir 15 is filled with urine, and as a result, a certain amount of urine is stored in the liquid reservoir 15. The urine that flows into the liquid reservoir 15 may include urine that has passed through the through holes 11*b* of the protective cover member 11.

Electrodes 14*a*, 14*b*, 14*c* on the substrate 14 are respectively arranged in the liquid reservoir 15 so as to face the space that serves as the liquid reservoir 15. As a result, when storing the urine that has flowed into the liquid reservoir 15, the electrodes 14*a*, 14*b*, and 14*c* come into contact with the urine.

The flow of the urine into the liquid reservoir 15 is caused by capillary action. Accordingly, the size of the liquid reservoir 15 (the width of the notch 13*a*, the thickness of the spacer member 13, etc.) is set to a size that causes capillary action. Further, a slit groove 12*a* of the channel cover member 12 communicates with the liquid reservoir 15 in order to cause capillary action, thereby, forming an airway (that is, a path through which air passes) connected to the liquid reservoir 15. Specifically, as for the size of the liquid reservoir 15, for example, when the width of the notch 13*a* is about 1 to 7 mm and the thickness of the spacer member 13 is about 0.1 to 0.6 mm, capillary action can be caused.

Further, urine flows into the liquid reservoir 15 through the liquid sampling port 15*a* serving as the inlet of the liquid reservoir 15. The liquid sampling port 15*a* is located at a boundary between the inside and outside of the space that forms the liquid reservoir 15, and is formed by the end 12*b* of the channel cover member 12, the end 13*b* of the spacer member 13, and the end 14*e* of the substrate. That is, the liquid sampling port 15*a* is formed by the end portions of the channel cover member 12, the spacer member 13 and the substrate 14, with all four sides surrounded by these ends. The present invention shows a case in which the ends 12*b*, 13*b*, and 14*e* are aligned so that the liquid sampling port 15*a* is formed in a rectangular shape with four sides surrounded by the ends, but the present invention is not necessarily limited thereto. That is, the liquid sampling port 15*a* does not necessarily have to be rectangular as long as it is located at the boundary between the inside and outside of the space, and may be formed in a circular shape, for example. Further, all the positions of the ends 12*b*, 13*b*, and 14*e* do not necessarily have to be aligned, and in that case, at least three sides are surrounded by the ends to form a space that becomes the liquid reservoir 15. Therefore, the boundary between the inside and outside of the space is defined by the positions of the ends surrounding the three sides. Therefore, the liquid sampling port 15*a* is positioned at the boundary.

Any one of the end 12*b* of the channel cover member 12, the end 13*b* of the spacer member 13, and the end 14*e* of the substrate 14 that form the liquid sampling port 15*a* is spaced upstream of the supply channel 11*a* at a predetermined distance (see arrow C in the figure) away from the position of the downstream end 11*c* of the protective cover member 11 in a plan view. Accordingly, the liquid sampling port 15*a* is also spaced upstream of the supply channel 11*a* at a predetermined distance (see arrow C in the figure) away from the downstream end 11*c* of the protective cover member 11 in a plan view. Details of the predetermined distance will be described later.

The wall surfaces constituting the liquid reservoir 15, that is, the surfaces of the channel cover member 12, the spacer member 13, and the substrate 14 surrounding the space that forms the liquid reservoir 15, are preferably hydrophilic treated surfaces, in order to facilitate the flow of the urine into the liquid reservoir 15. The term "hydrophilic treated surface" refers to a surface that has been treated to improve affinity (that is, hydrophilicity or wettability) with liquid (for example, water). The treatment for improving hydrophilicity may be performed using a known technique such as plasma treatment, and detailed description thereof will be omitted here.

It is preferable that all the surfaces of the wall surfaces constituting the liquid reservoir 15 are hydrophilic treated surfaces, but the present invention is not necessarily limited thereto, and at least one surface of the wall surfaces constituting the liquid reservoir 15 may be a hydrophilic surface. Even in that case, urine is more likely to flow into the liquid reservoir 15 than when there is no hydrophilic treated surface.

The hydrophilic treated surface may be arranged to a surface other than the wall surfaces, in addition to these wall surfaces constituting the liquid reservoir 15. Specifically, an exposed portion of the second surface of the protective cover member 11 (a portion not covered by the channel cover member 12, etc.), an end face constituting the downstream end 11*c* of the protective cover member 11, an end face constituting the downstream end 12*b* of the channel cover member 12, an end face constituting the downstream end 13*b* of the spacer member 13, and an end face constituting the downstream end 14*e* of the substrate 14, may be hydrophilic treated surfaces. When these surfaces are treated to be hydrophilic, urine can easily reach the liquid sampling port 15*a* of the liquid reservoir 15 from the supply channel 11*a*.

(Example of a Processing Operation in the Electrochemical Sensor)

Next, an example of a processing operation of the electrochemical sensor 10 according to this embodiment configured as described above will be described.

Figure 3:
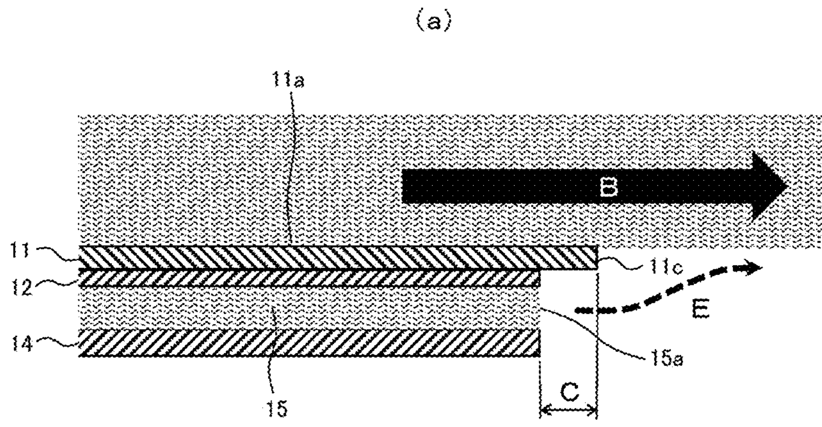
FIG. 3 is a side cross-sectional view schematically showing an example of a processing operation in a main part of the electrochemical sensor according to the first embodiment of the present disclosure.
Figure 3:
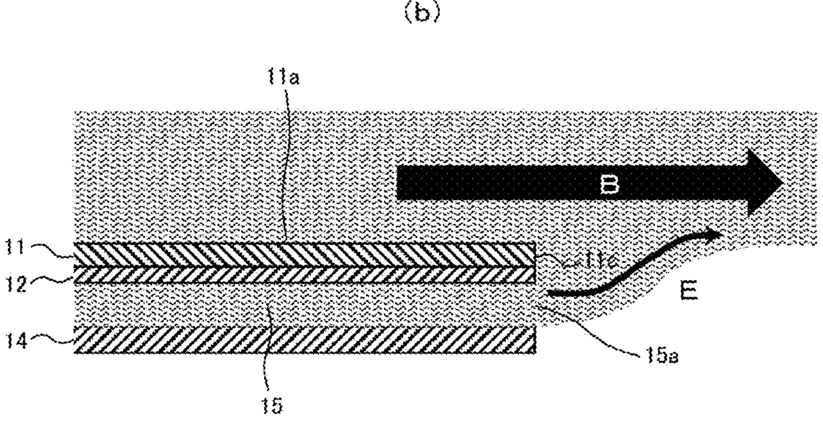

FIG. 3 is a side cross-sectional view schematically showing an example of the processing operation in the main part of the electrochemical sensor 10 according to this embodiment.

When detecting the uric acid concentration in the urine of a subject using the electrochemical sensor 10 according to this embodiment, the electrochemical sensor is first connected to the measuring device 20.

Then, the electrochemical sensor 10 connected to the measuring device 20 is brought into contact with the urine flowing from the subject's urination, while the subject holds the measuring device 20. Thereby, a urine supply channel 11*a* is formed on the first surface side of the protective cover member 11 in the electrochemical sensor 10.

When the urine supply channel 11*a* is formed, part of the urine that has passed through the downstream end 11*c* of the protective cover member 11 flows into the second surface of the protective cover member 11, and reaches the liquid sampling port 15*a* of the liquid reservoir 15. Then, the urine that has reached the liquid sampling port 15*a* flows into the space serving as the liquid reservoir 15 due to capillary action, to fill the space with the urine. Thereby, a certain amount of urine is stored in the liquid reservoir 15 due to a balance with the atmospheric pressure from the airway formed by the slit groove 12*a*, and this state is maintained.

At this time, when the protective cover member 11 includes the through hole 11*b*, the urine that has passed through the through hole 11*b* also reaches the liquid sampling port 15*a* and flows into the liquid reservoir 15. Accordingly, it becomes easy for the urine flowing through the supply channel 11*a* to flow into the liquid reservoir 15.

Further, when the wall surface constituting the liquid reservoir 15 is a hydrophilic surface, resistance generated when urine flows into the liquid reservoir 15 can be reduced, making it easier for the urine to flow into the liquid reservoir 15.

Further, the liquid reservoir 15 into which urine flows is communicated with the airway formed by the slit groove 12*a*. However, since the airway is covered with the protective cover member 11, urine does not flow into the liquid reservoir 15 from the airway side. That is, the airway is protected by the protective cover member 11, so that a certain amount of urine can be retained in the liquid reservoir 15.

When a certain amount of urine is stored in the liquid reservoir 15, inside of the liquid reservoir 15 is in a state where the working electrode 14*a*, the counter electrode 14*b* and the reference electrode 14*c* on the substrate 14 are in contact with the urine. In this state, a predetermined voltage is applied between the working electrode 14*a* and the counter electrode 14*b*, from the measuring device 20. Thereby, an oxidation-reduction reaction of uric acid occurs at the working electrode 14*a*, and a current (reaction current) flows through the working electrode 14*a*. The value of this reaction current is measured by, for example, cyclic voltammetry using a current measurement unit of the measuring device 20. The value of the reaction current may be measured using a technique such as square wave voltammetry (rectangular wave voltammetry), differential pulse voltammetry, normal pulse voltammetry, and alternating current voltammetry. Further, in a state in which urine is in contact, the potential difference (voltage difference) between the working electrode 14*a* and the reference electrode 14*c* is measured by a potential difference measurement unit of the measuring device 20.

Thereafter, for example, a cyclic voltammogram is created from the value of the reaction current measured by the current measurement unit of the measuring device 20, to acquire a current value of an oxidation peak. Then, the uric acid concentration in the urine is calculated (quantified) based on the acquired oxidation peak current value and the value of the potential difference measured by the potential difference measurement unit of the measuring device 20. It is disclosed in a known document (for example, Anal. Methods, 2018.10, 991-996, see FIGS. 3 and 4) that the value of the reaction current is correlated with the uric acid concentration. Accordingly, when the relationship between the reaction current value and the uric acid concentration is determined in advance, the uric acid concentration can be quantified based on the measured reaction current value.

Through the above-described steps, the uric acid concentration in the urine can be detected by electrochemical measurement even when the urine, which is a sample liquid, is supplied in a state of flow.

Incidentally, urination from a subject generally continues for a certain period of time. Therefore, even after a certain amount of urine is stored in the liquid reservoir 15, the urine may continue to flow in the supply channel 11*a* on the protective cover member 11.

In that case, since the urine flowing through the supply channel 11*a* and the urine stored in the liquid reservoir 15 are the same liquid, liquid molecules are attracted to each other by intermolecular forces, and an attractive force can be generated due to the affinity between the same liquids. That is, when the urine continues to flow in the supply channel 11*a*, the flow of the urine may exert a suction force to the urine stored in the liquid reservoir 15.

Therefore, for example, as in the reference example shown in FIG. 3(*b*), when the position of the downstream end 11*c* of the protective cover member 11 and the position of the liquid sampling port 15*a* of the liquid reservoir 15 are aligned in plan view of the protective cover member 11, the urine in the liquid reservoir 15 may be sucked out by the suction force (see arrow E in the figure) exerted by the flow of the urine in the supply channel 11*a*. When the urine in the liquid reservoir 15 is sucked out, a contact amount of urine to each electrode 14*a*, 14*b*, 14*c* on the substrate 14 cannot be guaranteed, thereby posing a concern that the sensing results using the electrodes 14*a*, 14*b*, and 14*c* may be adversely affected.

In contrast, as shown in FIG. 3(*a*), in the electrochemical sensor 10 according to the present embodiment, the liquid sampling port 15*a* of the liquid reservoir 15 is spaced upstream of the supply channel 11*a* at a predetermined distance (see arrow C in the figure) away from the downstream end 11*c* of the protective cover member 1 in a plan view. That is, the downstream end 11*c* of the protective cover member 11 protrudes toward the downstream side of the supply channel 11*a*, thereby blocking the flow of the urine in the supply channel 11*a*, when viewed from the liquid sampling port 15*a* of the liquid reservoir 15. Therefore, the urine flows into the liquid reservoir 15, and with the urine stored in the liquid reservoir 15, the suction force exerted by the flow of the urine in the liquid reservoir 15 can be weakened (see dashed arrow E in the figure) due to the distance of the liquid sampling port 15*a* from the downstream end 11*c*, even when the urine flows in the supply channel 11*a* (see arrow B in the figure). Accordingly, the electrochemical sensor 10 according to this embodiment can prevent the urine in the liquid reservoir 15 from being sucked out due to the flow of the urine in the supply channel 11*a*.

A predetermined distance between the downstream end 11*c* and the liquid sampling port 15*a* (that is, the amount of protrusion of the downstream end 11*c* as viewed from the liquid sampling port 15*a*) is set as described below.

The distance between the downstream end 11*c* and the liquid sampling port 15*a* is set such that the urine passing through the downstream end 11*c* can reach the liquid sampling port 15*a*. Specifically, the distance for allowing the urine to reach the liquid sampling port 15*a* may be set, in consideration of the surface tension of urine, the wettability of the second surface of the protective cover member 11, etc.

Further, the distance between the downstream end 11*c* and the liquid sampling port 15*a* is set to a distance that can weaken the suction force to the urine in the liquid reservoir 15, the suction force being exerted by the flow of the urine in the supply channel 11*a*. Specifically, a distance that can weaken the suction force may be set in consideration of the flow rate of the urine in the supply channel 11*a*, a surface tension of the urine, etc. More specifically, such a distance is the distance satisfying the relationship: retention force of the urine in liquid reservoir 15>suction force to the urine in the liquid reservoir 15.

That is, the distance between the downstream end 11*c* and the liquid sampling port 15*a* is set to a distance to weaken the suction force exerted by the urine that flows into the liquid sampling port 15*a* when there is no urine in the liquid reservoir 15, and exerted by the urine that flows through the supply channel 11*a* when there is urine in the liquid reservoir 15.

A specific example of such a distance (protrusion amount) is, for example, about 0.3 to 1.5 mm, preferably about 0.5 to 1.0 mm, and more preferably about 0.6 to 0.8 mm, when the sample liquid is the urine excreted from a human body.

When the protective cover member 11 includes the through hole 11*b*, the distance between the downstream end 11*c* and the liquid sampling port 15*a* may be set in consideration of a diameter of the through hole 11*b*.

However, even when the through hole 11*b* is provided, the area portion of the protective cover member 11 for blocking the flow of the urine in the supply channel 11*a*, is secured.

Figure 4:
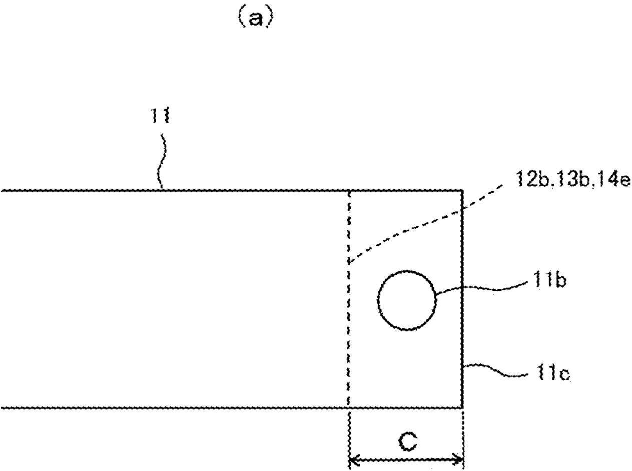
FIG. 4 is a partially enlarged view showing an example configuration of the main part of the electrochemical sensor according to the first embodiment of the present disclosure.
Figure 4:
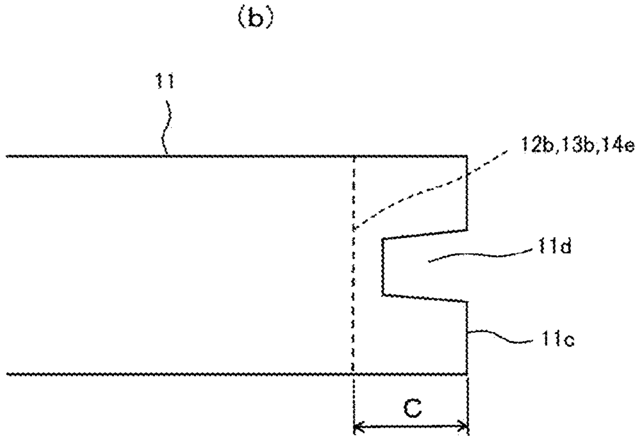

FIG. 4 is a partially enlarged view showing a configuration example of the main part of the electrochemical sensor according to this embodiment.

Specifically, as shown in FIG. 4(*a*), in the protective cover member 11, even when the through hole 11*b* is provided, any one of an area portion between the end 13*b* of the spacer member 13 and the upstream hole end of the through hole 11*b*; an area portion between the downstream hole end of the through hole 11*b* and the downstream end 11*c* of the protective cover member 11; and an area portion located on both sides of the through-hole 11*b* when viewed from the direction of the flow of urine in the liquid reservoir 15, functions as an area portion for blocking the flow of the urine in the supply channel 11*a*. Accordingly, even when the through hole 11*b* is provided, the suction force to the urine in the liquid reservoir 15 can be weakened by the above area portion of the protective cover member 11.

As described above, the electrochemical sensor 10 according to this embodiment can prevent the urine in the liquid reservoir 15 from being sucked out by the flow of the urine in the supply channel 11*a*, depending on the positional relationship between the downstream end 11*c* of the protective cover member 11 and the liquid sampling port 15*a* of the liquid reservoir 15. Thereby, even when the urine is supplied in a flowing state, it is possible to maintain a state in which a certain amount of urine is stored in the liquid reservoir 15, and therefore the contact amount of urine to each electrode 14*a*, 14*b*, 14*c* on the substrate 14 is guaranteed.

(Effect)

According to this embodiment, one or more of the following effects are exhibited.

(a) In this embodiment, when urine, which is a sample liquid, is supplied to the first surface side of the protective cover member 11, the supply channel 11*a* is formed on the first surface side, and the supplied urine flows through the supply channel 11*a*. Then, part of the urine flowing through the supply channel 11*a* flows into the second surface side of the protective cover member 11, and flows into the liquid reservoir 15 from the liquid sampling port 15*a* by using capillary action and is stored in the liquid reservoir 15. Accordingly, when the electrodes 14*a*, 14*b*, and 14*c* on the substrate 14 come into contact with the urine stored in the liquid reservoir 15, the uric acid concentration in the urine can be detected even when the urine, which is the sample liquid, is supplied in a flowing state.

In addition, according to this embodiment, the liquid sampling port 15*a* of the liquid reservoir 15 is spaced upstream of the supply channel 11*a* from the downstream end 11*c* of the protective cover member 11. Therefore, even when the urine flows in the supply channel 11*a* while the urine is stored in the liquid reservoir 15, the suction force exerted by the flow of the urine in the liquid reservoir 15 can be weakened (see dashed arrow E in the figure), due to the distance of the liquid sampling port 15*a* from the downstream end 11*c*. Thereby, the urine in the liquid reservoir 15 is prevented from being sucked out by the flow of the urine in the supply channel 11*a*. Accordingly, even when the urine is supplied in a flowing state, it is possible to maintain a state in which a certain amount of urine is stored in the liquid reservoir 15. Therefore, the contact amount of the urine to each electrode 14*a*, 14*b*, 14*c* on the substrate 14 is guaranteed, and the uric acid concentration in the urine can be detected with high accuracy using each electrode 14*a*, 14*b*, 14*c*.

(b) According to this embodiment, by providing the through hole 11*b* in the protective cover member 11, the urine flowing through the supply channel 11*a* can easily flow into the liquid reservoir 15. That is, even when the downstream end 11*c* of the protective cover member 11 protrudes from the liquid sampling port 15*a* of the liquid reservoir 15, by facilitating the flow of the urine into the liquid reservoir 15 using the through hole 11*b*, it is possible to easily reliably realize a state in which a certain amount of urine is stored in the liquid reservoir 15.

(c) According to this embodiment, by making the wall surface constituting the liquid reservoir 15 a hydrophilic surface, the resistance generated when urine flows into the liquid reservoir 15 can be reduced, compared to the case of not being a hydrophilic treated surface. This makes it easier to cause urine to flow into the liquid reservoir 15, thereby making it possible to easily and reliably realize a state in which a certain amount of urine is stored in the liquid reservoir 15.

(d) According to this embodiment, the slit groove 12*a* provided in the channel cover member 12 constitutes the airway connected to the liquid reservoir 15. Therefore, urine flows into the liquid reservoir 15 from the liquid sampling port 15*a*, and a certain amount of urine is stored in the liquid reservoir 15. In this case, the airway is covered and protected by the protective cover member 11. Therefore, urine does not flow into the liquid reservoir 15 from the airway side, and a constant amount of urine can be reliably retained in the liquid reservoir 15.

Modified Example

Although the first embodiment of the present disclosure has been specifically described above, the first embodiment is not necessarily limited to the contents described above, and can be variously modified without departing from the gist thereof.

For example, the first embodiment shows an example that the sample liquid is urine, but the present disclosure is not limited to such an aspect. For example, the sample liquid may be body fluid such as blood, saliva, runny nose, sweat, tears, etc., in addition to urine, as long as it is supplied in a flowing state. Further, the sample liquid is not limited to that derived from humans, and may be derived from animals such as dogs and cats.

Further, the first embodiment shows an example in which the specific substance contained in the sample liquid is uric acid, but the present disclosure is not limited to such an aspect. For example, the specific substance contained in the sample liquid may be urinary sugar, arginine, albumin, etc., in addition to the uric acid.

Further, the first embodiment shows an example in which the concentration of the specific component in the sample liquid is measured by the three-electrode method, but the present disclosure is not limited to such an aspect. For example, the |concentration of the specific component in the sample liquid may be measured by a two-electrode method. In this case, the sensor electrode may have two electrodes of a working electrode and a counter electrode (or reference electrode).

Further, the first embodiment shows an example in which the protective cover member 11 includes the through hole 11*b*, but the present disclosure is not limited to such an aspect. For example, as shown in FIG. 4(*b*), the protective cover member 11 may include a notch 11*d* instead of the through hole 11*b*. When the notch 11*d* is provided, as in the case of the through hole 11*b*, urine flowing through the supply channel 11*a* easily flows into the liquid reservoir 15, and in addition, the suction force to the urine in the liquid reservoir 15 can be weakened by the area portion for blocking the flow of the urine in the supply channel 11*a*.

Further, this embodiment shows, for example, a case in which the slit groove 12*a* is provided in the channel cover member 12, thereby forming the airway connected to the liquid reservoir 15, but the present disclosure is not limited to such an aspect. For example, the spacer member 13 may be configured by a slit-processed portion (not shown) formed in the spacer member 13, and in that case, the channel cover member 12 may not be provided. Further, the airway connected to the liquid reservoir 15 may be configured by at least one of a grooved portion (not shown) formed in the substrate 14 and a through hole (not shown) formed in the substrate 14. Even when the through-hole formed in the substrate 14 functions as an airway, the through-hole is located on the side opposite to the urine supply channel 11*a*, thereby suppressing the inflow of the urine from the airway side.

The length for forming the protective cover member 11 may be limited as long as the inflow of the urine from the airway side can be suppressed. Specifically, for example, in the case where the channel cover member 12 includes the slit groove 12*a*, the protective cover member 11 may be long enough to protect the airway, and instead of the downstream end 11*c* of the protective cover member 11, the downstream end 12*b* of the channel cover member 12 may be positioned so as to protrude beyond the spacer member 13. Even in such a case, due to the protrusion of the end 12*b* of the channel cover member 12 beyond the spacer member 13, the suction force to the urine in the liquid reservoir 15 can be weakened, the suction force being exerted by the flow of the urine, while guiding part of the urine into the liquid reservoir 15. That is, with a configuration including the protective cover member 11 and the channel cover member 12, it becomes possible to make these laminates function as "plate-like members", and as long as at least one of the ends 11*c* and 12*b* is spaced from the liquid sampling port 15*a* of the liquid reservoir 15, the effect described in the first embodiment is exhibited.

Further, the first embodiment shows, for example, the case in which the concentration is measured while applying voltage during pouring of urine, but the present disclosure is not limited to such an aspect. For example, the same effect can be obtained even when the concentration is measured while applying voltage after completion of the pouring.

Second Embodiment

Next, a second embodiment of the present disclosure will be described. Here, differences from the first embodiment are mainly described.

Figure 5:
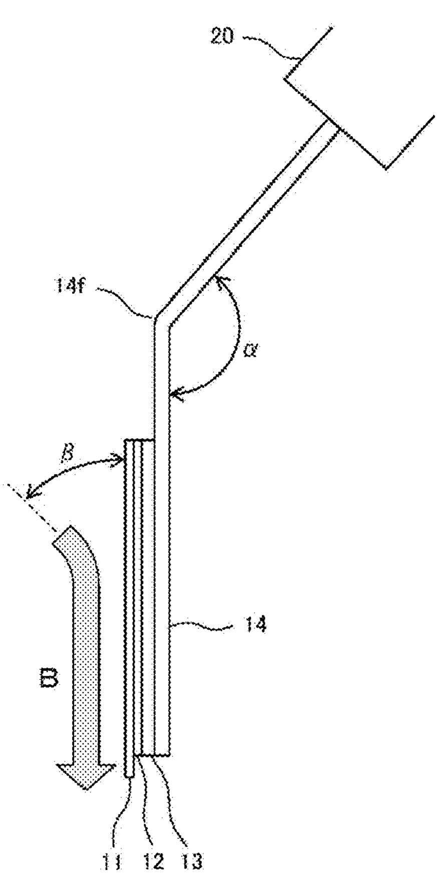
FIG. 5 is a side view showing a configuration example of the main part of an electrochemical sensor according to a second embodiment of the present disclosure.

FIG. 5 is a side view showing a configuration example of the main part of the electrochemical sensor according to this embodiment.

As shown in the figure, in the electrochemical sensor according to this embodiment, the substrate 14, which is one of the laminated members with the protective cover member 11, includes a bent portion 14*f*.

The bent portion 14*f* is a portion that connects the side of the substrate 14 on which the electrodes 14*a*, 14*b*, and 14*c* are mounted (that is, the side on which the protective cover member 11, etc., are laminated) and the side of the substrate 14 to be inserted into the measuring device 20, in a non-parallel manner. Non-parallel means that the sides are not parallel but meet at a given bending angle $\alpha$.

When the urine flowing by urination from the subject is supplied while holding the measuring device 20 by the subject, the measuring device 20 being the device in which substrate 14 having the above a configuration is inserted, the urine is incident on the first surface of the protective cover member 11 laminated on the substrate 14 at an incident angle $\beta$, and forms the supply channel 11*a* on the first surface. The bending angle $\alpha$ of the bent portion 14*f* is set in consideration of the incident angle $\beta$ of the urine, as described below.

For example, the bending angle $\alpha$ of the bent portion 14*f* is set so that the incident angle $\beta$ of urine is as small as possible. When the bending angle $\alpha$ is set in this manner, splashing of urine when it is incident on the first surface of the protective cover member 11, can be suppressed, and therefore a sufficient flow rate of urine flowing through the supply channel 11*a* can be secured. Accordingly, a sufficient amount of urine that flows into the second surface side of the protective cover member 11 can be secured. This is very preferable for filling the liquid reservoir 15 with urine from the liquid sampling port 15*a*.

Further, for example, the bending angle $\alpha$ of the bent portion 14*f* is set so that the incident angle $\beta$ of urine becomes as large as possible. When the bending angle α is set in this manner, a vector component in a direction along the supply channel 11*a* becomes small, and therefore after urine is incident on the first surface of the protective cover member 11, the flow velocity of the urine flowing through the supply channel 11*a* can be kept low. Accordingly, since the flow rate of urine is low, the suction force to the urine in the liquid reservoir 15 can be weakened even in the case of not a large amount of protrusion of the downstream end 11*c* of the protective cover member 11 from the liquid sampling port 15*a* of the liquid reservoir 15. That is, the amount of protrusion of the downstream end 11*c* can be kept small.

Other parts are configured in the same manner as in the case of the first embodiment.

According to the configuration of the present embodiment as described above, the following effects are obtained in addition to one or more of the effects described in the first embodiment.

(e) According to this embodiment, the bent portion 14*f* is provided on the substrate 14, and by setting the bending angle α of the bent portion 14*f*, the incident angle β of urine with respect to the supply channel 11*a* can be small, or the incident angle β of urine with respect to the supply channel 11*a* can be large. The small incident angle β of urine is very preferable to fill the liquid reservoir 15 with urine from the liquid sampling port 15*a*, and the large incident angle β of urine enables the suction force to the urine in the liquid reservoir 15 to be weakened even in the case of not a large amount of the protrusion of the downstream end portion 11*c* of the protective cover member 11. Accordingly, in either case, the usability of the subject who uses the electrochemical sensor is improved, and the convenience for the subject becomes excellent.

Although the second embodiment of the present disclosure has been specifically described above, the second embodiment is not necessarily limited to the contents described above, and can be variously modified without departing from the gist thereof.

For example, the second embodiment shows an example in which the substrate 14 includes the bent portion 14*f*, but the present disclosure is not limited to such an aspect. That is, the bent portion 14*f* may be provided on at least one of the protective cover member 11 or a laminated member with the protective cover member 11 (specifically, channel cover member 12, spacer member 13, substrate 14, etc.), and when it is provided in at least one of them, the convenience for the subject becomes excellent.

Third Embodiment

Next, a third embodiment of the present disclosure will be described. Also here, mainly the differences from the first embodiment or the second embodiment will be described.

Figure 6:
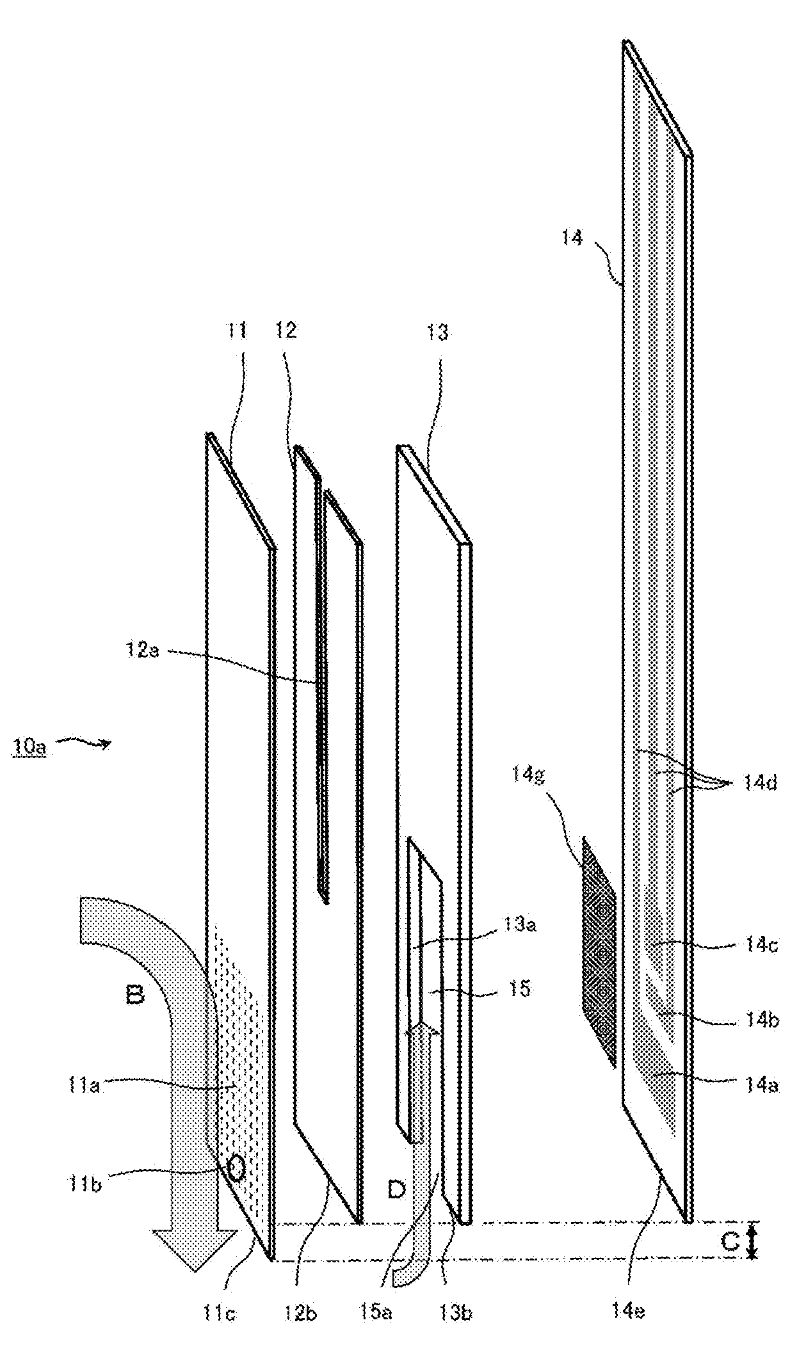
FIG. 6 is an exploded perspective view schematically showing a configuration example of an electrochemical sensor according to a third embodiment of the present disclosure.

FIG. 6 is an exploded perspective view schematically showing a configuration example of the electrochemical sensor 10*a* according to this embodiment. Also in the figure, like the case of FIG. 2, each component is shown in a separated state for the sake of convenience.

The electrochemical sensor 10*a* according to this embodiment differs in electrode configuration from the case of the first embodiment or the second embodiment.

In this embodiment, each electrode 14*a*, 14*b*, 14*c* on the substrate 14, particularly at least the working electrode 14*a*, is covered by an enzyme membrane 14*g*.

The enzyme membrane 14*g* comprises an enzyme, an electron carrier and a hydrophilic polymer. A known enzyme, electron mediator, and hydrophilic polymer can be used, and detailed descriptions thereof are omitted here.

The electrochemical sensor 10*a* having such an electrode configuration performs quantitative analysis to a specimen, by reducing an electron carrier by electrons generated by a reaction between the substrate and the enzyme contained in the sample liquid, and electrochemically measuring an amount of reduction of the electron carrier by the measuring device 20. That is, the electrochemical sensor 10*a* functions as an enzyme sensor using an enzyme as a molecular identification element that specifically reacts with a specific substance in the test liquid, and corresponds to a type of biosensor, which is a sensor that utilizes a molecular recognition ability of biomolecules such as microorganisms, enzymes, and antibodies.

Other parts are configured in the same manner as in the case of the first embodiment or the second embodiment. That is, the sample liquid is supplied to the electrochemical sensor 10*a* in a flowing state, and the sample liquid is stored in the liquid reservoir 15 by utilizing capillary action. Then, even when the sample liquid flows in the supply channel 11*a* in that state, the sample liquid in the liquid reservoir can be prevented from being sucked out by the flow of the sample liquid in the supply channel 11*a* due to the separation between the downstream end 11*c* and the liquid sampling port 15*a*, and it is possible to maintain the state in which the liquid reservoir 15 stores a certain amount of sample liquid.

As described above, the configuration of this embodiment also has one or more of the effects described in the first embodiment or the second embodiment.

This means that in addition to the electrochemical sensor using electrochemical reactions (for example, oxidation-reduction reactions), the characteristic configuration of the present disclosure can also be applied to a biosensor which is a sensor that utilizes the molecular recognition ability of biomolecules, as long as the sample liquid is supplied in a flowing state, and can be applied to, for example, an ion sensor using an ion-selective membrane that enables measurement of ionic components such as sodium ions and potassium ions in urine that is a sample liquid, as long as the sample liquid is supplied in a flowing state. When applied to an ion sensor, an ion selective membrane is arranged instead of the enzyme membrane 14*g*.

That is, the electrochemical sensor according to the present disclosure can be applied to those used in a wide range of fields such as a medical/drug discovery field, a food field, and an environmental field. Specifically, the electrochemical sensor according to the present disclosure includes: a sensor that detects a specific component in a body fluid by using an electrochemical reaction (e.g. redox reaction); a biosensor that use the molecular recognition ability of biomolecules, an ion sensor that uses an ion-selective membrane, etc. By use of the characteristic configuration of the present disclosure, such an electrochemical sensor can prevent the stored sample liquid from being sucked out, after retention of the sample liquid due to capillary action, even when the sample liquid in contact with the sensor, continues to flow.

Preferable Aspects of the Present Disclosure

Preferable aspects of the present disclosure will be supplementarily described below.

Supplementary Description 1

According to one aspect of the present disclosure, there is provided an electrochemical sensor, including:

a plate-like member having a first surface and a second surface that are in a front-back relationship and a sample liquid supply channel arranged on a first surface side;

a liquid reservoir, which is arranged on a second surface side of the plate-like member and into which part of the sample liquid flows, the sample liquid having passed through a downstream end of the plate-like member that includes the supply channel; and a liquid sampling port serving as an inlet of the liquid reservoir, which is spaced upstream of the supply channel from the downstream end of the plate-like member in a plan view.

Supplementary Description 2

Preferably, there is provided the electrochemical sensor according to supplementary description 1, wherein a through hole or a notch is provided in the vicinity of the downstream end of the plate member.

Supplementary Description 3

Preferably, there is provided the electrochemical sensor according to supplementary description 1 or 2, wherein at least one surface of wall surfaces of the liquid reservoir is a hydrophilic surface.

Supplementary Description 4

Preferably, there is provided the electrochemical sensor according to any one of supplementary descriptions 1 to 3, including an airway connected to the liquid reservoir.

Supplementary Description 5

Preferably, there is provided the electrochemical sensor according to any one of supplementary descriptions 1 to 4, wherein at least one of the plate-like member or a laminated member with the plate-like member includes a bent portion.

Supplementary Description 6

Preferably, there is provided the electrochemical sensor according to any one of supplementary descriptions 1 to 5, including:

a spacer member and a substrate laminated on the plate-like member, the spacer member including: a notch in the liquid reservoir, and the substrate including: electrodes in the liquid reservoir, wherein a specific component in the sample liquid is detected, in a contact state of the electrodes with the sample liquid that has flowed into the liquid reservoir.

Supplementary Description 7

Preferably, there is provided the electrochemical sensor according to any one of supplementary descriptions 1 to 6, wherein a distance between the downstream end and the liquid sampling port is set to a distance that satisfies a relationship of retention force of the sample liquid in the liquid reservoir>suction force to the sample liquid in the liquid reservoir.

DESCRIPTION OF SIGNS AND NUMERALS

10, 10*a* Electrochemical sensor
11 Protective cover member
11*a* Supply channel
11*b* Through hole
11*c* Downstream end
11*d* Notch
12 Channel cover member
12*a* Slit groove
12*b* End
13 Spacer member
13*a* Notch
13*b* End
14 Substrate
14*a* Working electrode
14*b* Counter electrode
14*c* Reference electrode
14*d* Wiring
14*f* Bent portion
14*g* Enzyme membrane (ion selective membrane)
15 Liquid reservoir
15*a* Liquid sampling port
20 Measuring device

The invention claimed is:

1. An electrochemical sensor, comprising:

a plate-like member having a first surface and a second surface that are in a front-back relationship and a sample liquid supply channel arranged on a first surface side;

a liquid reservoir, which is arranged on a second surface side of the plate-like member and into which part of the sample liquid flows, the sample liquid having passed through a downstream end of the plate-like member that includes the supply channel; and a liquid sampling port serving as an inlet of the liquid reservoir, which is spaced upstream of the supply channel from the downstream end of the plate-like member in a plan view.

2. The electrochemical sensor according to claim 1, wherein a through hole or a notch is provided in the vicinity of the downstream end of the plate member.

3. The electrochemical sensor according to claim 1, wherein at least one surface of wall surfaces of the liquid reservoir is a hydrophilic surface.

4. The electrochemical sensor according to claim 1, comprising an airway connected to the liquid reservoir.

5. The electrochemical sensor according to claim 1, wherein the plate-like member or a laminated member with the plate-like member includes a bent portion.

6. The electrochemical sensor according to claim 1, comprising:

a spacer member and a substrate laminated on the plate-like member, the spacer member including: a notch in the liquid reservoir, and the substrate including: electrodes in the liquid reservoir, wherein a specific component in the sample liquid is detected, in a contact state of the electrodes with the sample liquid that has flowed into the liquid reservoir.

* * * * *